United States Patent [19]

Chen et al.

[11] Patent Number: 5,043,102

[45] Date of Patent: Aug. 27, 1991

[54] CONDUCTIVE ADHESIVE USEFUL FOR BONDING A SEMICONDUCTOR DIE TO A CONDUCTIVE SUPPORT BASE

[75] Inventors: Andrew Chen, Covina; Richard L. Frentzel, Chino Hills, both of Calif.

[73] Assignee: Advanced Products, Inc., Cheshire, Conn.

[21] Appl. No.: 443,633

[22] Filed: Nov. 29, 1989

[51] Int. Cl.$^5$ .............................................. H01B 1/06
[52] U.S. Cl. .................................... 252/514; 523/428; 523/429; 523/434; 523/457; 523/459; 428/413; 428/416; 428/414; 156/330; 156/307.1; 156/307.3
[58] Field of Search ............... 252/514, 500; 523/457, 523/459, 427, 428, 429, 434; 156/325, 307.3, 307.1, 330, 330.9, 335; 437/1; 428/209, 210, 413, 416, 418, 901; 357/8

[56] References Cited

U.S. PATENT DOCUMENTS

| | | | |
|---|---|---|---|
| 4,410,457 | 10/1983 | Fiyimura et al. | 252/514 |
| 4,975,221 | 12/1990 | Chen | 252/514 |
| 4,994,207 | 2/1991 | Edelman et al. | 252/514 |

*Primary Examiner*—Josephine Barr
*Attorney, Agent, or Firm*—William A. Simons

[57] ABSTRACT

A conductive die attach composition containing no solvent and substantially no ionic impurities which comprises:

(a) an epoxy resin system comprising (i) at least one low viscosity epoxy resin; and (ii) at least one epoxy resin hardener;
(b) at least one unsaturated monomer which, when polymerized, is not capable of reacting with said epoxy resin system;
(c) at least one free radical initiator for polymericing said unsaturated monomer; and
(d) finely divided silver particles.

20 Claims, No Drawings

CONDUCTIVE ADHESIVE USEFUL FOR BONDING A SEMICONDUCTOR DIE TO A CONDUCTIVE SUPPORT BASE

The present invention relates to a selected conductive adhesive useful for attaching a semiconductor die to a conductive support base (e.g., a metal lead frame). The present invention also relates to the bonded product comprising the semiconductor die and conductive support material bonded together with said conductive adhesive.

It is known to employ conductive adhesives to bond semiconductor die to conductive support bases such as lead frames or conductive circuit patterns on ceramic substrates or printed wiring boards. Such adhesive formulations usually contain conductive metal particles encased in a suitable resinous material. Examples of commonly used die attach adhesives are eutectic solders, conductive epoxy, and imide pastes. See U.S. Pat. Nos. 3,676,252; 4,410,457; 4,518,735; and 4,759,874.

In the usual operation, a small amount of the conductive adhesive is applied to the support base and the semiconductor die is then placed upon that spot. The die is pressed down to provide good contact with the adhesive. The adhesive then is allowed to cure and thereby bond the die to the support base. Later, the die may be further wire bonded to the support base and coated with an encapsulant to protect it during use.

A suitable conductive adhesive for this die-attach function must possess a combination of properties, including the following:

1. It should be easy to prepare and apply.
2. It should have a relatively long storage life after being made up so that it does not have to be used immediately after it is made.
3. It should have an acceptable long, usable duration ("pot life" or from the time from the drop-feed of the adhesive composition up to the time at which the adhesive composition loses its chip-bonding ability).
4. It should be capable of forming a strong bond between the die and support base.
5. It should have an acceptable low resistivity or high conductivity.
6. It should not contain significant amounts of ionic (e.g., sodium, potassium, chloride, and ammonium ions) impurities.
7. During the curing step, it should give off a minimum amount of volatiles which may create voids and weaken the bond between the die and support base.
8. After curing is completed, it should be thermal stable and reduce stresses between relatively large die and substrates at the high temperatures that may be experienced during the wire bonding and encapsulation steps. In this regard, the cured adhesive should not allow the die to move on the support base or give off further volatiles which may interfere with the operation of the die.

Eutectic solders are metal alloys typically made with gold. A "preform", which is a metal foil cut to the shape and size of the semiconductor chip, is deposited on the desired substrate of the package and is heated to a temperature near the melting point of the preform. The chip can then be placed onto the preform with a scrubbing motion. Although eutectic solders are very reliable and exhibit outstanding thermal stability, they are expensive and difficult to process.

Prior art conductive epoxies are typically low viscosity pastes containing at least 70% of an electrically conductive metal, typically silver. The epoxy is applied to the substrate of the package by conventional means and the chip is then placed in contact with the coated substrate. The epoxy can then be cured in one step. These conventional epoxies are less expensive than eutectic solders, are easy to process, and exhibit excellent adhesive strength. However, they have high levels of ionic impurities, contain solvents, are brittle so that they do not reduce stresses between die and substrates, and have a relatively short pot life, properties which are necessary for advanced applications in electronics.

There are numerous teachings of epoxy resins being used for die attach adhesive formulations. For example, U.S. Pat. No. 3,676,252, which issued to Allington on July 11, 1972, teaches a solventless adhesive composition suitable for attaching (mounting) a ceramic chip capacitor to a substrate which contains (a) a low viscosity liquid epoxy resin having a viscosity of less than about 4,000 centiposes at 25° C.; (b) a hardener therefore (e.g., methyl-4-endomethylene tetrahydrophthalic anhydride or other acid anhydride and modified amine-type resin hardeners); (c) accelerators (e.g., benzyl dimethylamine, tri(dimethyl amino methyl) phenol, and dimethyl amino methyl phenol); and (d) silver powder or dust. This patent further teaches the desirability of not using a solvent in these type of compositions since the presence of solvents may form voids and bubbles or may form an undesirable pyramidal shape or may cause the composition to dry on the screen during the printing process. However, the pot life of these type of adhesives is very short. Also, the use of anhydrides in these types of formulations leads to a hydrolysis reaction which may result in an undesirable skin on the surface.

U.S. Pat. No. 4,410,457, which issued to Fujimura et al. on Oct. 18, 1983, teaches an electroconductive paste useful for bonding electronic elements to metal lead frames and/or substrates which contain (a) an electroconductive filler (e.g., a noble metal powder or flake); (b) a reactive solvent (e.g., phenylglycidyl ether, butylglycidyl ether, neopentyl glycol glycidyl ether); and (c) a hardening compound comprising (i) an epoxy resin; (ii) a latent hardener, and (iii) an epoxy compound-dialkylamine adduct which functions as a hardening promoter. The patent also teaches (col. 4, lines 39-43) that the resin Paste may also contain solvent viscosity regulating agents, fillers, coloring agents. The reactive solvents used herein contain large amounts of chloride impurities.

Conventional imide adhesives have greater high temperature stability than epoxy adhesives. However, imides are not generally very soluble in conventional solvents and may require higher curing temperatures and times (e.g., generally at 275° C. for 1 hour or more). Furthermore, the presence of additional amounts of solvent in commercial imide-type adhesive formulations may cause undesirable voiding underneath the die or significant outgassing during the wire bonding or encapsulation steps. Any of these adverse effects may cause the rejection of the encapsulated semiconductor die.

In view of the deficiencies of the prior art, a die attach adhesive composition that is easy to process, exhibits excellent adhesive strength, has thermal stability at high temperatures, and imparts low stresses on large die is needed. Furthermore, an adhesive composition, that does not require any solvent for use as a die attach, does not require a two-step cure and does not exhibit a substantial weight loss on cure, is needed.

The present invention, therefore, is directed to a conductive adhesive composition containing no solvent and substantially no ionic impurities comprising:
(a) an epoxy resin system comprising
  (i) at least one low viscosity epoxy resin; and
  (ii) at least one epoxy resin hardener;
(b) at least one unsaturated monomer which, when polymerized, is not capable of reacting with said epoxy resin system;
(c) at least one free radical initiator for polymerizing said unsaturated monomer; and
(d) silver particles.

Further, the present invention is directed to a semiconductor die bonded to a conductive support base by means of a conductive adhesive composition wherein said conductive adhesive composition before curing contains no solvent and substantially no ionic impurities and comprises:
(a) an epoxy resin system comprising
  (i) at least one low viscosity epoxy resin; and
  (ii) at least one epoxy resin hardener
(b) at least one unsaturated monomer which, when polymerized, is not capable of reacting with said epoxy resin system;
(c) at least one free radical initiator for polymerizing said vinyl unsaturated monomer; and
(d) finely divided silver particles.

The uncured conductive adhesive composition employed in the process of the present invention has four critical components: an epoxy resin system; at least one unsaturated monomer; at least one free radical initiator; and silver particles.

Any low viscosity liquid epoxy resin may be used herein which has at least one epoxy group per molecule and has a viscosity of less than 5,000 centiposes at 25° C. Such epoxy resins include, for example, polyglycidyl ethers produced by the reaction between a polyhydric phenol (e.g., bisphenol A, bisphenol F, catechol, resorcinol, and the like) or a polyhydric alcohol (e.g., glycerin, polyethylene glycol, and the like) and epichlorohydrin; polyglycidyl ether esters produced by the reaction between a hydroxycarboxylic acid (e.g., p-oxybenzoic acid, beta-oxynaphthoic acid, and the like) and epichlorohydrin; polyglycidyl esters obtained from a polycarboxylic acid (e.g., phthalic acid, terephthalic acid, and the like); glycidylamine compounds obtained from 4,4′-diaminodiphenyl methane, m-aminophenol, and the like; epoxidized novolacs and epoxidized polyolefins.

The preferred epoxy resins include liquid low viscosity bisphenol F epoxy resins having a viscosity of less than 4,500 centiposes at 25° C. One example is EPICLON 830A available from Dainippon Ink and Chemicals, Inc. This resin has an epoxide equivalent weight in the range of 165-180; a viscosity in the range of about 3,000-4,500; and a maximum amount of 100 ppm of hydrolyzable chlorine. Another preferred liquid bisphenol F epoxy resin is ARATRONIC 5046 available from Ciba-Geigy Corporation. This epoxy resin has a viscosity of 1,200-1,800 centiposes at 25° C.; an epoxy value of 5.9-6.3 eg/kg and maximum amounts of 50 ppm hydrolyzable chlorine, 1 ppm ionic $Cl^-$, $Na^+$, and $K^+$.

The epoxy resin hardener (or latent curative) which may be used herein include ureas, guanidines, hydrazides, amines, amides, and the like. Concrete examples of these compounds include acetylmethyl urea, benzylurea, thiourea, 3-(substituted or unsubstituted) phenyl-1,1-di-($C_1$-$C_4$ alkyl) urea (e.g., 3-phenyl-1,1-dimethylurea, 3-(4-chlorophenyl)-1,1-dimethylurea, 3-phenyl-1,1-dibutylurea, and the like), acetylsemicarbazide, acetaldehyde, semicarbazone, acetone semicarbazone, N,N′-diphenylguanidime, methylguanidine. biguanide, dicyandiamide sebacic acid dihydrazide, succinic acid dihydrazide, adipic acid dihydrazide, tartaric acid dihydrazide, dicyandiamidine, hydrazobenzene, acetaldehyde phenylhydrazone, benzophenone phenylhydrazone, benzamidine, melamine, azobenzene, diaminoazobenzene, and the like. The most preferred epoxy hardeners are dicyandiamide and modified aliphatic polyamines. It is also preferred that these hardeners be low in ionic impurities.

An optional component in the present adhesive formulation is an epoxy resin accelerator. The preferred epoxy resin accelerators are imidazoles. The most preferred accelerators are 2-phenyl-4,5-dihydroxymethylimidazole and 1-cyanoethyl-2-ethyl-4-methylimidazole.

The unsaturated monomer component may be any unsaturated monomer which is capable of being polymerized with a free radical initiator and, when polymerized do not react with the epoxy resin system. Instead, the cured adhesive will produce a heterogeneous polymer mixture where the cured and polymerized unsaturated monomer is intermixed with the cured epoxy resin. Two suitable types of unsaturated monomers are N-vinyl pyrrolidone and acrylate monomers.

The preferred unsaturated monomer component is an acrylate monomer. Generally, acrylate monomers are made by Processes which do not introduce ionic impurities into the monomers. Furthermore, acrylate monomers generally polymerize quickly and are believed to produce a more flexible cured adhesive composition which leads to less stress on a large semiconductor die. Suitable acrylic monomers include methyl methacrylate, ethyl methacrylate, acrylonitrile, methacrylatonitrile, methyl acrylate, ethyl acrylate, butyl methacrylate, cyclohexyl methacrylate, hexyl methacrylate, 2-ethylhexyl acrylate, lauryl acrylate, methacrylate acid, acrylic acid glycidyl methacrylate, isobornoyl methacrylate, ethylene glycol, higher glycol acrylates and methacrylates and hexamethylene diacrylate. The most preferred acrylate monomer is a mixture of isobornoyl methacrylate and hexamethylene diacrylate.

Free radical initiators (or free radical generators) are well known to those skilled in the art and are described, for example, in "Free Radical in Solution" C. Welling, J. Wiley & Sons, New York, 1957 and in "The Chemistry of Organic Film Foamers" D. H. Solomon, J. Wiley and Sons, New York, 1967. The preferred classes of free radical initiators are organic peroxides and hydroperoxides. The most preferred free radical initiators are t-butyl perbenzoate; 1,1-di(t-butyl peroxy) cyclohexane; and 2,5-dimethyl-2,5-di(2-ethylhexanoyl peroxy).

Silver is the desired electrical conductive metal of the present die attach adhesive composition. The silver particles must be in a finely divided form suitable for intimate blending with the epoxy resin system and monomer, for example, silver flake or powder.

The silver particles preferably have an average particle diameter of about 0.1 to about 10 microns. Silver flakes containing low ionic impurities (i.e.. less than 100 ppm of $Cl^-$, $Na^+$, $K^+$, and $NH^+_4$) are especially preferred because of their electroconductivity advantages. Such preferred high purity silver flakes are those commercially available from Metz Metallurgical Corporation of South Plainfield, NJ, Handy & Harmon Inc. of Fairfield, CT, and Chemet Corporation of Attleboro, MA.

The preferred, more preferred, and most preferred of the four components of the present invention are as follows:

| Component | Preferred (parts by wt.) | More Preferred (parts by wt.) | Most Preferred (parts by wt.) |
| --- | --- | --- | --- |
| Epoxy Resin System | | | |
| (i) Epoxy Resin | 6-18 | 8-16 | 11-14 |
| (ii) Hardener | 0.1-3 | 0.2-2 | 0.2-1.8 |
| (iii) Accelerator | 0-1.5 | 0.2-1.1 | 0.3-1.0 |
| Unsaturated Monomer | 1.5-7.0 | 1.8-6.0 | 2.5-5.5 |
| Free Radical Initiator | 0.01-0.1 | 0.02-0.08 | 0.03-0.07 |
| Silver Particles | 70-90 | 75-85 | 77-83 |

Minor amounts of other additives (not other resin precursors) may be added to the uncured adhesive composition. For example, it may be desired by adding in from about 0.01 to about 10 parts of either a reactive diluent, a viscosity regulating agent, a coupling agent, or a coloring agent or the like. The final viscosity of the uncured adhesive composition should be from about 2,000 to about 200,000, preferably from about 7,500 to about 60,000 centiposes at 25° C. to ensure easy application of the adhesive onto the support base material or the semiconductor die. The uncured adhesive should have a surface resistivity of less than about 10, preferably less than about 5, ohms per square at 1 mil thickness. The phrase "substantially no ionic impurities" as used in this specification and claims means that the total conductive adhesive composition contains less than about 100 parts of ionic impurities per million parts by weight of the total composition. The term "ionic impurities" is generally represented by the sum of the four most common ionic impurities—$Na^+$, $K^+$, $Cl^-$, and $NH-_4$. Preferably, the impurities--Na 4 amount of ionic impurities is less than about 50 ppm by weight.

The uncured adhesive composition of the present invention may be easily obtained by weighing out the above-mentioned ingredients and mixing them together in a conventional manner such as in a 3-roll mill or the like. The composition may be then applied to either the conductive support base material or the semiconductor die or both. Generally, the composition is applied to the conductive support base. The composition can be applied by screen printing, syringe dispensing, or dot transferring using automated or manual die bonding equipment.

After the uncured adhesive is applied, the semiconductor die and conductive support base are contacted together by any conventional means. The term "conductive support base" as used herein includes standard metal lead frames or conductive circuit patterns on a ceramic substrate or a printed wiring board. It may also include a ground or other reference material. Normally, simple pressing together to form a level void-free layer of the uncured adhesive between the two is the desired procedure. Next, the adhesive is thermally cured, usually by the application of heat in the temperature range from about 125° C. to 300° C. for a period of time of 30 seconds to one hour.

After curing, the semiconducter die may be wire bonded and encapsulated by conventional techniques.

The following Examples and Comparisons are provided to better illustrate the present invention. All parts and percentages are by weight unless explicitly stated otherwise.

EXAMPLES 1-3

Three conductive die attach compositions having the components listed below were prepared by first mixing the two epoxy resins together (Components A and B) together using a Cowles mixer. The epoxy hardeners (Components D and L) and accelerators (Components C and J) were then added to the epoxy resin mixture and then homogeneous mixtures were obtained. These three mixtures were each combined with the acrylate monomers (Components E and F), free radical initiators (Components G, K, and M), and silver flake material (Components H and I) and then roll milled until a homogeneous mixture was obtained.

| Component | Example 1 (pts by wt) | Example 2 (pts by wt) | Example 3 (pts by wt) |
| --- | --- | --- | --- |
| Epoxy Resin #1 (A) | 9.68 | — | 10.62 |
| Epoxy Resin #2 (B) | 3.06 | 13.629 | 2.66 |
| 2-Phenyl-4,5-dihydroxy-methylimidazole (C) | 0.38 | 0.959 | 0.66 |
| Dicyandiamide (D) | 1.40 | 0.280 | — |
| Hexamethylene diacrylate (E) | 2.22 | 2.498 | 2.31 |
| Isobornoyl methacrylate (F) | 2.22 | 2.498 | 2.31 |
| t-Butyl perbenzoate (G) | 0.06 | — | — |
| Silver Flake #1 (H) | 54.12 | 39.968 | 53.80 |
| Silver Flake #2 (I) | 26.86 | 39.968 | 26.91 |
| 1-Cyanoethyl-2-ethyl-4-methylimidazole, (J) | — | 0.140 | — |
| 1,1-di(t-butyl peroxy) cyclohexane (K) | — | 0.060 | — |
| Modified aliphatic polyamine (L) | — | — | 0.66 |
| 2,5-Dimethyl-2,5-di(2-ethylhexanoyl peroxy) (M) | — | — | 0.07 |
| | 100.00 | 100.000 | 100.00 |

(A) ARATRONIC 5046-available from Ciba Geigy. 3 Skyline Drive. Hawthorne. NY 10532
(B) EPICLON 830A-available from DIC Americas. Inc.. 119 East Start of India Lane, Carson, CA 90746
(C) CUREZOL 2PHZ-P-available from Pacific Anchor. 6055 East Washington Blvd., Los Angeles, CA 90040
(D) Dicyandiamide-available from Impex Company. 5855 Naples Plaza. Long Beach. CA 90803
(E) Hexamethylene diacrylate-available from Radcure Specialties. 5365-A Robin Hood Road, Norfolk, VA 23513
(F) Isobornoyl methacrylate-available from Alcolac, 3440 Fairfield Road. Baltimore, MD 21228
(G) t-Butyl Perbenzoate-available from Witco Chemical Corporation. 850 Morton Avenue, Richmond. CA 94804
(H) CHEMET Silver Flake GA-004X-available from Chemet Corporation. 52 Gardner Street, Attleboro, MA 02703
(I) CHEMET Silver Flake GB-0026-available from Chemet Corporation. 52 Gardner Street, Attleboro. MA 02703
(J) CUREZOL 2E4MZ-CN-available from Pacific Anchor Chemical Corporation.
(K) USP-400-available from Witco Chemical Corporation.
(L) ANCAMINE 2014AS epoxy resin hardener-available from Pacific Anchor Chemical Corporation. The chemical identity of this product is a trade secret of its manufacturer.
(M) USP-245-available from Witco Chemical Corporation.

The die attach adhesive system of Example 1 posses the following properties:

At refrigeration temperature (0° C.), shelf life is 6 months.

At room temperature (25° C.), shelf life is about 3 weeks.

| | |
|---|---|
| Viscosity @ 25° C.: | 30,000 CPS |
| Very low ionics content: | |
| Chloride Content | <10 PPM |
| Sodium Content | <5 PPM |
| Potassium Content | <5 PPM |
| Service Temperature Range: | −50° to 150° C. |
| Tensile Shear Strength: Al to Al @ 25° C. | 1,600 PSI |
| Weight Loss @ 300° C. (TGA): | <0.1% |
| Glass Transition Temperature: Tg (DSC) | 106° C. |
| Total Weight Loss During Cure at 175° C. for 1 Hour: | 0.83% |
| Minimum Cure Time at 175° C. (DSC): | 15 Minutes |
| Outgassing Test per ASTM-E-595 and NADA SP-R-0022A: | |
| Total Mass Loss (TML): | 0.08% |
| Collected Volatile Condensable Material (CVCM): | 0.0% |
| Water Vapor Recovered (WVR): | 0.08% |

This adhesive system was also employed to attach semiconductor dies to metal lead frames using the following cure schedules:
A. 1 hour curing at 150° C.
B. 30 minutes curing at 160° C.
C. 20 minutes curing at 175° C.
D. 30 seconds curing at 275° C.
E. 20 seconds curing at 275° C.
F. 40 seconds curing at 275° C.

The volume resistivity and die shear values of the adhesive system were measured after each of these six curing schedules and reported values are as follows:

| Cure Schedule | Volume Resistivity (OHM-CM) | Die Shear @ 25° C. (50 × 50 Mil) | Die Shear @ 150° C. (100 × 140 Mil) | Die Shear @ 250° C. (100 × 140 Mil) |
|---|---|---|---|---|
| 1 Hour @ 150° C. | 0.0004 | 8.5 Kg | — | — |
| 30 Mins. @ 160° C. | 0.0004 | — | — | — |
| 20 Mins. @ 175° C. | 0.0002 | — | 6.5 Kg | 2.6 Kg |
| 30 Secs. @ 275° C. | 0.0002 | 4.5 Kg | — | 2.2 Kg |
| 20 Secs. @ 275° C. | — | 4.0 Kg | — | — |
| 40 Secs. @ 275° C. | — | 5.0 Kg | — | — |

The die attach adhesive of Example 2 is a faster cure version of Example 1. It has the following properties:

| | |
|---|---|
| Density: | 28.28 lbs./gal. |
| Snap curable (60 seconds @ 200° C.) | |

Has excellent die shear strength and conductivity. Meets ASTM-E-595 and NASA SP-R-0022-A specifications for thermal vacuum, low vacuum outgassing.

Has less than 1% weight loss during cure (DSC, 170° C/1 hour). Has a low ionic contamination. Recommended storage temperatures are from −10° C. to −40° C.

Has a working pot life at room temperature (25° C.) of about five days.

The recommended cure schedules for this adhesive composition are as follows:

| Conventional Oven | Hot Plate |
|---|---|
| 15 minutes @ 150° C. | 60 seconds @ 200° C. |
| 5 minutes @ 175° C. | |
| 60 seconds @ 200° C. | |

The adhesive composition of Example 3 has chemical and physical properties similar to the composition of Example 1.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated herein by reference in their entirety.

What is claimed is:

1. A conductive die attach composition containing no solvent and substantially no ionic impurities which comprises:
   (a) an epoxy resin system comprising
      (i) 6–18 parts by weight at least one low viscosity liquid epoxy resin; and
      (ii) 0.1–3 parts by weight at least one epoxy resin hardener;
   (b) 1.5–7.0 parts by weight at least one unsaturated monomer which, when polymerized, is not capable of reacting with said epoxy resin system;
   (c) 0.01–0.1 parts by weight at least one free radical initiator for polymerizing said unsaturated monomer; and
   (d) 70–90 parts by weight finely divided silver particles.

2. The conductive die attach composition of claim 1 which further contains (a) (iii) 0–1.5by weight an epoxy resin accelerator.

3. The conductive die attach composition of claim 1 wherein said epoxy resin is a liquid bisphenol F epoxy resin.

4. The conductive die attach composition of claim 1 wherein said epoxy resin hardener is dicyandiamide or a modified aliphatic polyamine.

5. The conductive die attach composition of claim 1 wherein said unsaturated monomer is an acrylate monomer which is not capable of reaction with said epoxy resin system.

6. The conductive die attach composition of claim 1 wherein said free radical initiator is selected from the group consisting of t-butyl perbenzoate; 1,1-di(t-butyl peroxy) cyclohexane; 2,5-dimethyl-2,5di(2-ethyl hexanoyl peroxy); and mixtures thereof.

7. The conductive die attach composition of claim 2 wherein the relative amounts of each component are as follows:
(a) epoxy resin system
  (i) epoxy resin—8-16 parts by weight;
  (ii) epoxy resin hardener—0.2-1.1 parts by weight;
(b) unsaturated monomer—1.8-6.0 parts by weight;
(c) free radical initiator—0.02-0.08 parts by weight; and
(d) silver particles—75-85 parts by weight.

8. The conductive die attach composition of claim 7 comprising:
(a) epoxy resin system comprising (i) a liquid bisphenol F epoxy resin; (ii) an epoxy hardener selected from dicyandiamide and modified aliphatic polyamine; and (iii) an epoxy resin accelerator selected from the group consisting of 2-phenyl-4,5-dihydroxymethylimidazole, 1-cyanoethyl-2-ethyl-4-methylimidazole, and mixtures thereof;
(b) an acrylate monomer selected from the group consisting of hexamethylene diacrylate, isobornoyl methacrylate, and mixtures thereof.
(c) a free radical initiator selected from the group consisting of t-butyl perbenzoate; 1-cyanoethyl-2-ethyl-4-methylimidazole; 2,5-dimethyl-2,5-di(2-ethyl hexanoyl peroxy); and mixtures thereof; and
(d) silver flakes having an average particle diameter of about 0.1 to about 10 microns.

9. The conductive die attach composition of claim 8 wherein the relative amounts of each component is as follows:
(a) (i)—11-14 parts by weight;
(a) (ii)—0.2-1.8 parts by weight;
(a) (iii)—0.3-1.0 parts by weight;
(b)—2.5-5.5 parts by weight;
(c)—0.03-0.07 parts by weight; and
(d)—77-83 parts by weight.

10. The die attach composition of claim 9 wherein the final viscosity of the uncured adhesive composition is from about 2,000 to about 200,000 centiposes at 25° C., and the surface resistivity is of less than about 10 ohms per square at 1 mil thickness.

11. A semiconductor die bonded to a conductive support base by means of a conductive adhesive composition wherein said conductive adhesive composition before curing contains no solvent and substantially no ionic impurities and comprises:
(a) an epoxy resin system comprising
  (i) 6-18 parts by weight at least one low viscosity liquid epoxy resin; and
  (ii) 0.1-3 parts by weight, at least one epoxy resin hardener;
(b) 1.5-7.0 parts by weight at least one unsaturated monomer which, when polymerized, is not capable of reacting with said epoxy resin system;
(c) 0.01-0.1 parts by weight at least one free radical initiator for polymerizing said unsaturated monomer; and
(d) 70-90 parts by weight finely divided silver particles.

12. The bonded semiconductor die of claim 11 which further contains (a) (iii) 0-1.5 parts by weight an epoxy resin accelerator.

13. The bonded semiconductor die of claim 11 wherein said epoxy resin is a liquid bisphenol F epoxy resin.

14. The bonded semiconductor die of claim 11 wherein said epoxy resin hardener is dicyandiamide or a modified aliphatic polyamine.

15. The bonded semiconductor die of claim 11 wherein said unsaturated monomer is an acrylate monomer which is not capable of reaction with said epoxy resin system.

16. The bonded semiconductor die of claim 11 wherein said free radical initiator is selected from the group consisting of t-butyl perbenzoate; 1,1-di(t-butyl peroxy) cyclohexane; 2,5-dimethyl-2,5-di(2-ethyl hexanoyl peroxy); and mixtures thereof.

17. The bonded semiconductor die of claim 32 wherein the relative amounts of each component are as follows:
(a) epoxy resin system
  (i) epoxy resin—8-16 parts by weight;
  (ii) epoxy resin hardener—0.2-2 parts by weight;
  (iii) epoxy resin accelerator—0.2-1.1 parts by weight;
(b) unsaturated monomer—1.8-6.0 parts by weight;
(c) free radical initiator—0.02-0.08 parts by weight; and
(d) silver particles—75-85 parts by weight.

18. The bonded semiconductor die of claim 17 wherein said die attach composition comprises:
(a) epoxy resin system comprising (i) a liquid bisphenol F epoxy resin; (ii) an epoxy hardener selected from dicyandiamide and modified aliphatic polyamine; and (iii) an epoxy resin accelerator selected from the group consisting of 2-phenyl-4,5-dihydroxymethylimidazole, 1-cyanoethyl-2-ethyl-4-methylimidazole, and mixtures thereof;
(b) an acrylate monomer selected from the group consisting of hexamethylene diacrylate, isobornoyl methacrylate, and mixtures thereof.
(c) a free radical initiator selected from the group consisting of t-buryl perbenzoate; 1-cyanoethyl-2-ethyl-4-methylimidazole; 2,5-dimethyl-2,5-di(2-ethyl hexanoyl peroxy); and mixtures thereof; and
(d) silver flakes having an average particle diameter of about 0.1 to about 10 microns.

19. The bonded semiconductor die of claim 18 wherein the relative amounts of each component is as follows:
(a) (i)—11-14 parts by weight;
(a) (ii)—0.2-1.8 parts by weight;
(a) (iii)—0.3-1.0 parts by weight;
(b)—2.5-5.5 parts by weight;
(c)—0.03-0.07 parts by weight; and
(d)—77-83 parts by weight.

20. The bonded semiconductor die of claim 19 wherein the final viscosity of the uncured adhesive composition is from about 2,000 to about 200,000 centiposes at 25° C., and the surface resistivity is of less than about 10 ohms per square at 1 mil thickness.

* * * * *

UNITED STATES PATENT AND TRADEMARK OFFICE
CERTIFICATE OF CORRECTION

PATENT NO. : 5,043,102
DATED : August 27, 1991
INVENTOR(S) : Andrew Chen and Richard L. Frentzel It is certified that error appears in the above-identified patent and that said Letters Patent is hereby corrected as shown below:

In Column 9, line 8 delete "0.2-1.1" and insert --0.2-2--.

In Column 9, line 9 insert --(iii) epoxy resin accelerator--0.2-1.1 parts by weight;--.

In Column 9, line 18, after the word "from" insert --the group consisting of--.

In Column 10, line 35, after the word "from" insert --the group consisting of--.

In Column 10, line 44, delete "t-buryl" and insert --t-butyl--.

Signed and Sealed this

Third Day of August, 1993

Attest:

MICHAEL K. KIRK

Attesting Officer

Acting Commissioner of Patents and Trademarks